May 27, 1969     T. T. JULIAN, JR     3,446,515
TRUCK BED LOAD BINDER
Filed Sept. 14, 1967     Sheet _1_ of 2
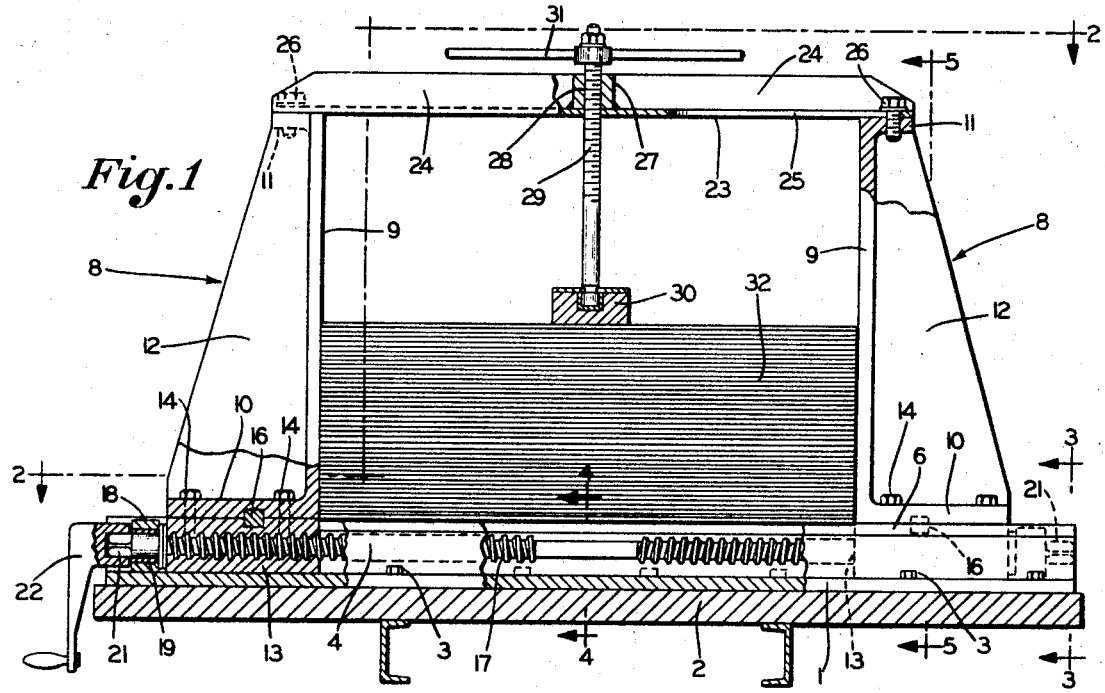
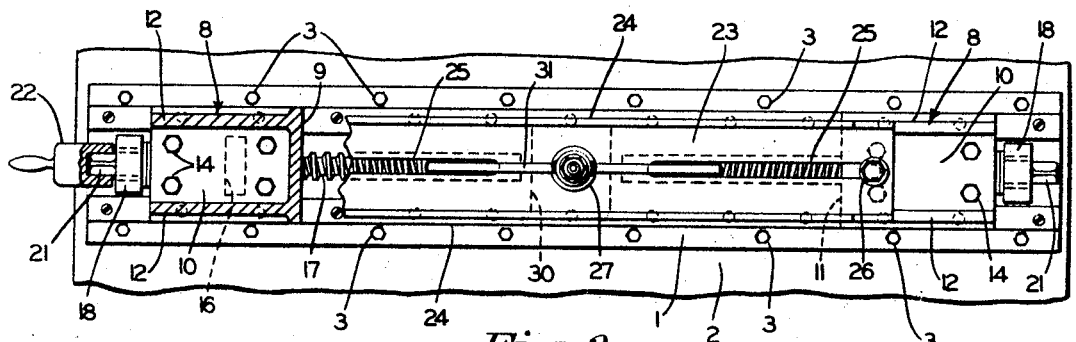
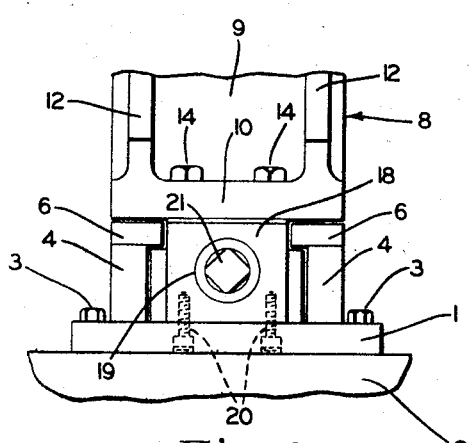
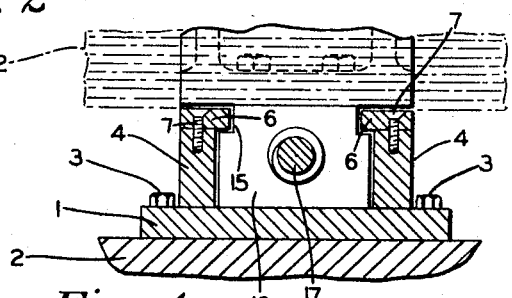
INVENTOR.
Thomas T. Julian Jr.
BY
Frease & Bishop
ATTORNEYS May 27, 1969     T. T. JULIAN, JR     3,446,515
TRUCK BED LOAD BINDER
Filed Sept. 14, 1967     Sheet 2 of 2
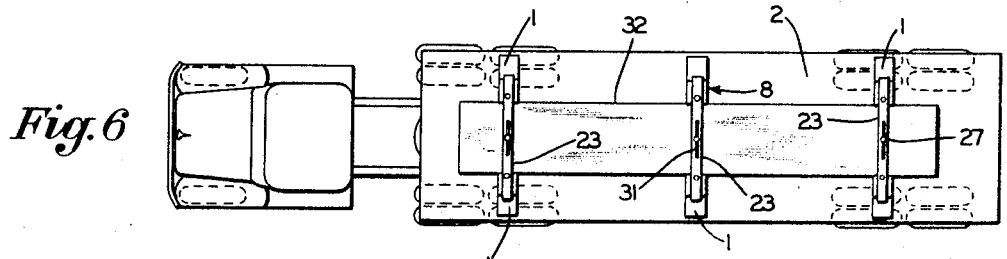
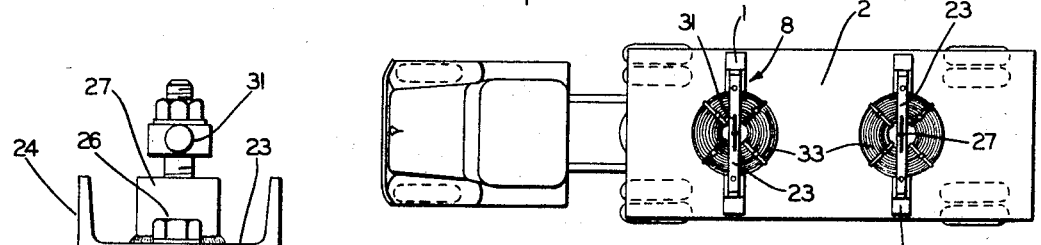
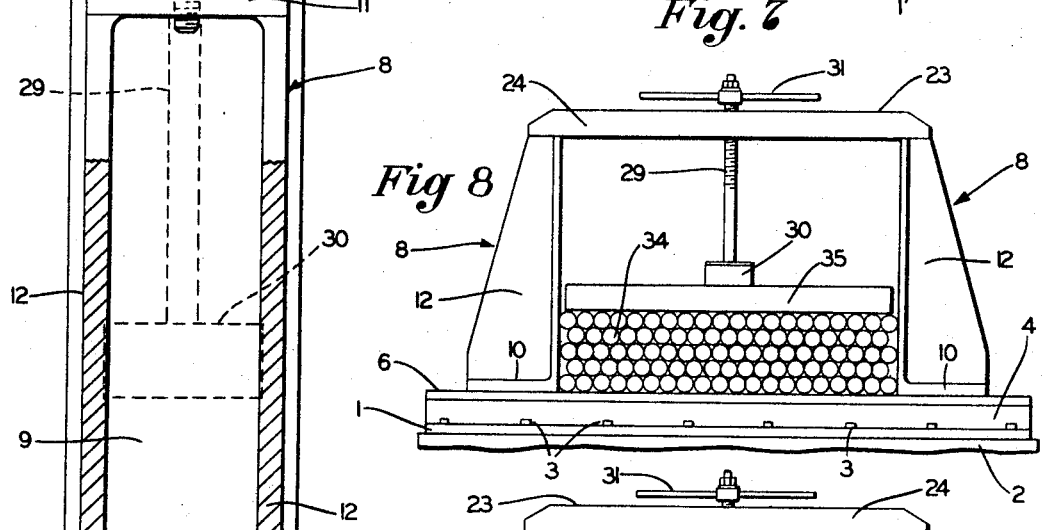
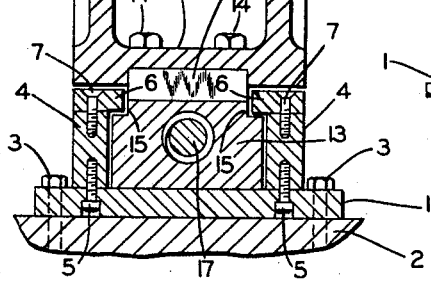
INVENTOR.
Thomas T. Julian Jr.
BY
Frease & Bishop
ATTORNEYS

United States Patent Office 3,446,515
Patented May 27, 1969

3,446,515
TRUCK BED LOAD BINDER
Thomas T. Julian, Jr., 1901 Ivy St. NW.,
North Canton, Ohio 44720
Filed Sept. 14, 1967, Ser. No. 667,819
Int. Cl. B60p 7/08
U.S. Cl. 280—179             6 Claims

ABSTRACT OF THE DISCLOSURE

A truck bed load binder vise having two spaced posts slidable laterally toward and from each other on a truck or trailer bed, freight car or other vehicle, pressure pads on the opposed faces of the posts for clamping against opposite sides of a load of steel, left and right-hand screw means operating the posts, a cross member slidably connected to the upper ends of the posts, a screw shaft threaded centrally through the cross member, and a pressure pad on the lower end of the screw shaft for clamping upon the top of the load of steel.

BACKGROUND OF THE INVENTION

Field of the invention

The invention relates to load binders for binding a steel load to a truck or a trailer bed, or to a railroad car, airplane or other vehicle, and more particularly to a load binder vise comprising means for clamping opposite sides of a load of steel or the like and means for clamping the top of the load against the bed of the truck or the like.

Description of the prior art

Loads of steel on tractor-trailer rigs and the like are very heavy, are difficult to bind to the trailer bed, and can cause considerable damage, as well as bodily injury or death, if they loosen or slip.

Under present practice, it is customary to bind such loads with more or less conventional chain binders. However, such chain binders are known to frequently break or slip, releasing the steel load. Attempts have been made to provide means for clamping such steel loads but no such device so far produced has been completely rigid and entirely integrated.

SUMMARY OF THE INVENTION

In general terms, the invention may be briefly described as comprising an elongated base plate adapted to be located transversely of the bed of a truck or trailer, freight car, airplane, or other vehicle, and connected thereto, there being guides on the side edges of the base plate.

A pair of posts are slidably mounted upon the base plate, having grooves therein slidably receiving the guides. A nut is fixed in the lower end of each post and a left and right-hand screw is journalled upon the base plate and engages both nuts.

Means is provided for rotating said screw to slidably move the posts toward and from each other on the base plate. Pressure pads are provided on the opposed faces of the posts for clamping therebetween a steel load resting upon the bed of the truck or the like, and tapered bracing flanges are provided on the outer sides of the posts.

A cross member is adjustably connected to the upper ends of the posts by means of slots on opposite sides of the center of the cross member and screws located through said slots.

A vertical screw shaft is located through the center of the cross member and has a pressure pad upon its lower end for clamping contact with the top of the steel load.

A primary object of the invention is to provide a load binder in the form of a vise for clamping against opposite sides and the top of a load of steel.

Another object of the invention is to provide such a load binder vise including a pair of posts with means for moving them in unison toward or away from each other.

A further object of the invention is to provide a load binder vise of the character referred to having a cross member adjustably connected to the posts and a screw shaft therethrough having a pressure pad upon its lower end.

A still further object of the invention is to provide a load binder vise of this type having nuts in the posts and a left and right-hand screw engaging said nuts.

Another object of the invention is to provide such a load binder vise in which the posts are slidably mounted upon an elongated base plate adapted to be located transversely upon a truck bed or the like and attached thereto.

A further object of the invention is to provide a load binder of the character referred to having guide flanges upon the base plate and cooperating means upon the posts.

A still further object of the invention is to provide a load binder vise of this type in which the posts have pressure pads upon opposed faces and tapered bracing flanges are provided upon the outer sides of the posts.

These and other objects, apparent from the drawings and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principle, being set forth in detail in the following description and illustrated in the accompanying drawings.

BRIEF DESCRIPTION OF THE DRAWINGS

FIG. 1 is a side elevation with parts broken in section of a load binder vise embodying the invention, mounted upon the bed of a truck or trailer, showing a load of steel sheets clamped therein;

FIG. 2 is a plan sectional view taken as on the line 2—2, FIG. 1, the load of steel sheets being omitted for the purpose of illustration;

FIG. 3 is a fragmentary end view of the base plate, guides and lower portion of one sliding post, looking in the direction of the arrows 3—3, FIG. 1;

FIG. 4 is a fragmentary transverse sectional view taken on the line 4—4, FIG. 1, showing the base plate and guides in section, and the lower portion of one post, the nut carried thereby and the double screw in section;

FIG. 5 is a vertical section on the line 5—5, FIG. 1;

FIG. 6 is a top plan view of a tractor-trailer showing three of the load-binding vises clamping a load of steel sheets or the like upon the trailer bed;

FIG. 7 is a similar view showing two of the load-binding vises each clamping a coil of steel upon the trailer bed;

FIG. 8 is a side elevation of one of the load-binding vises used in clamping a load of steel bars; and FIG. 9 is a similar view of one of the load-binding vises clamping a steel coil.

DESCRIPTION OF THE PREFERRED EMBODIMENT

Referring now to the embodiment of the invention illustrated, the load-binding vise to which the invention pertains includes an elongated base plate 1 upon which all of the parts of the vise are carried.

One, two or more of these base plates are adapted to be located transversely of the bed 2 of a trailer, truck, railroad car, airplane or other vehicle, depending upon the size and shape of the load of steel to be bound to the bed. The base plate 1 is adapted to be rigidly connected to the bed 2 by screws or bolts 3.

Upright flanges 4 may be formed upon opposite side edges of the base plate 1, or rigidly attached thereto as by screws 5. Opposed guide ribs 6 may be formed upon the upper ends of the flanges 4 or rigidly attached thereto as by the screws 7.

A pair of upright posts or vise jaws, indicated generally at 8, are mounted upon the base plate 1 and slidable toward and from each other. These posts may be in the form of steel castings, or may be made up of steel plates welded or otherwise rigidly connected together.

Each post comprises a vertical flat pressure pad 9, faced inwardly or toward the other post, a horizontal outwardly disposed bottom flange 10, a horizontal outwardly disposed top flange 11, and the vertical, upwardly tapered bracing flanges 12.

A nut 13 is connected to the underside of the bottom flange 10 and is notched on each side, as at 15, to accommodate the guide ribs 6, so as to be slidable between the upright flanges 4 on the base plate. A key 16 is located in corresponding grooves in the bottom flange 10 and nut 13 to prevent shear of the screws 14.

For the purpose of moving the posts 8 toward and from each other in order to clamp a load of steel therebetween or to release the same, a left-and-right hand screw 17 is journalled in bearings 18 mounted upon opposite end portions of the base plate 1. The bearings 18 may be provided with suitable bushings 19. The bearings 18 may be rigidily attached to the base plate 1 as by screws 20, or may be welded or otherwise attached thereto.

Each end of the double screw 17 may be squared as indicated at 21, and an operating crank 22 may be detachably connected thereto for rotating the screw in either direction as desired.

A cross member 23 is slidably connected to the upper ends of the posts 8. This cross member may be of channel shape having the reinforcing flanges 24 at its side edges. For the purpose of slidably connecting the cross member 23 to the upper ends of the posts 8 an elongated slot 25 may be provided in the cross member on each side of the center thereof. Adjusting screws 26 are located through the slots 25 and threaded into suitable tapped openings in the upper flanges 11 of the posts 8.

A bearing boss 27 is welded or otherwise attached to the center of the cross member 23 and has a tapped vertical opening 28 therein through which the vertical screw shaft 29 is threaded. A pressure pad 30 is swiveled upon the lower end of the screw shaft 29 and handle bars 31 are fixed to the upper end thereof for rotating the screw shaft.

Referring to FIG. 1, the screws 26 may be loosened and the double screw 17 may be rotated in proper direction by the operating crank 22 to clamp opposite sides of the steel pack 32 between the pressure pads 9 of the posts 8.

The screws 26 may then be tightened connecting the cross member 23 rigidly to the upper ends of the posts 8, after which the handle bars 31 may be rotated in proper direction to clamp the pressure pad 30 against the top of the steel pack 32 thus clamping the steel pack tightly down upon the bed of the trailer, truck or the like.

As shown in FIG. 6, there are a plurality of the load binder vises provided depending upon the length of the steel pack or load.

Referring to FIGS. 7 and 9, it is seen that a single coil of steel 33 may be rigidly clamped upon the truck bed by each load binder vise, the pressure pads 9 upon the sliding posts 8 engaging diametrically opposite sides of the coil, while the pressure pad 30 engages the top of the coil.

In FIG. 8 is shown the manner in which a load of steel bars or the like may be clamped upon a truck bed or the like. Opposite sides of the load of steel bars 34 are engaged by the pressure pads 9 of the sliding posts 8, and a timber or plank 35 may be laid laterally across the top of the load of bars, the pressure pad 30 engaging the top of the timber and clamping the bars to the bed. As in the case of the steel pack 32, two or more of the load binder vises may be used for each load of steel bars, depending upon the length of the bars.

From the above it will be obvious that a rigid integrated steel load binder is provided which overcomes the above difficulties and objections and which may be easily and readily operated to bind various types of steel loads upon the bed of a truck or the like.

I claim:
1. A truck bed load binder vise comprising two spaced upright posts slidable horizontally toward and from each other, upright pads on the opposed faces of the posts, screw means for moving the posts toward and from each other, a cross member upon the upper ends of the posts, said cross member having slots therein, screws in the upper ends of the posts located through the slots for slidably connecting the cross member to the posts, a screw shaft threaded vertically through the cross member and a pressure pad upon the lower end of the screw shaft.

2. A truck bed load binder vise as defined in claim 1, in which the screw means includes a left and right-hand screw, nuts in said posts engaging said left and right-hand screw, and means for rotating said left and right-hand screw.

3. A truck bed load binder vise as defined in claim 1, including a base plate upon which the posts are slidably mounted.

4. A truck bed load binder vise as defined in claim 3, in which guide ribs are formed on each side of the base plate and the posts are provided with grooves slidably receiving said guide ribs.

5. A truck bed load binder vise as defined in claim 1, in which integral upwardly tapered bracing flanges are provided on the outer sides of the posts and are connected to integral horizontal flanges at the lower ends of the posts.

6. A truck bed load binder vise as defined in claim 1, including a base plate upon which the posts are slidably mounted, guide flanges on each side of the base plate, the posts being provided with grooves slidably receiving said flanges, upwardly tapered bracing flanges on the outer sides of said posts, the screw means including a left and right-hand screw, nuts in said posts engaging said left and right-hand screw and means for rotating said left and right-hand screw.

References Cited

UNITED STATES PATENTS 2,388,304  11/1945  Ackerman et al. _____ 280—179

LEO FRIAGLIA, *Primary Examiner.*

ROBERT R. SONG, *Assistant Examiner.*

U.S. Cl. X.R.

280—408, 414, 456